United States Patent
Hyland et al.

(10) Patent No.: US 10,945,211 B2
(45) Date of Patent: Mar. 9, 2021

(54) UNDERWATER POWER SAVING MECHANISM FOR USE IN AN COMMUNICATION NETWORK

(71) Applicant: WFS Technologies LTD., Lothian (GB)

(72) Inventors: Brendan Peter Hyland, Edinburgh (GB); Grant MacLean, Edinburgh (GB)

(*) Notice: Subject to any disclaimer, the term of this patent is extended or adjusted under 35 U.S.C. 154(b) by 129 days.

(21) Appl. No.: 14/770,432

(22) PCT Filed: Feb. 25, 2014

(86) PCT No.: PCT/GB2014/050568
§ 371 (c)(1),
(2) Date: Aug. 25, 2015

(87) PCT Pub. No.: WO2014/128512
PCT Pub. Date: Aug. 28, 2014

(65) Prior Publication Data
US 2016/0007293 A1    Jan. 7, 2016

(30) Foreign Application Priority Data
Feb. 25, 2013    (GB) .................................... 1303328

(51) Int. Cl.
*H04W 52/02*    (2009.01)
*H04W 24/08*    (2009.01)
(Continued)

(52) U.S. Cl.
CPC ...... *H04W 52/0235* (2013.01); *H04B 5/0031* (2013.01); *H04B 5/0075* (2013.01); *H04W 24/08* (2013.01); *Y02D 30/70* (2020.08)

(58) Field of Classification Search
CPC . H04W 52/0235; H04W 24/08; H04W 52/02; H04W 88/027; H04B 5/0031;
(Continued)

(56) References Cited

U.S. PATENT DOCUMENTS

| | | |
|---|---|---|
| 4,207,568 A | 6/1980 | MacLeod |
| 4,878,232 A | 10/1989 | Fisher |

(Continued)

FOREIGN PATENT DOCUMENTS

| | | |
|---|---|---|
| EP | 0609694 A2 | 8/1994 |
| GB | 2 163 029 A | 2/1986 |

(Continued)

OTHER PUBLICATIONS

International Search Report, dated Jun. 4, 2014 from International Application No. PCT/GB2014/050568.
(Continued)

*Primary Examiner* — Pablo N Tran
(74) *Attorney, Agent, or Firm* — Wolf, Greenfield & Sacks, P.C.

(57) ABSTRACT

An underwater communications network comprising a plurality of communication nodes operable to wirelessly communicate with at least one other node in the network, each node having a transceiver and an observation mechanism wherein the observation mechanism is operable to monitor signals received by the transceiver and upon reception of a first predetermined tone the observation mechanism outputs a signal operable to adjust the node from a passive operation mode to an active operation mode. Each node can be a discreet underwater device.

19 Claims, 8 Drawing Sheets

(51) Int. Cl.
*H04L 12/28* (2006.01)
*H04L 29/08* (2006.01)
*H04B 5/00* (2006.01)

(58) Field of Classification Search
CPC ....... H04B 5/0075; H04M 3/02; H04Q 11/02; H04Q 2213/13098; Y02D 70/00; Y02D 30/70
See application file for complete search history.

(56) References Cited

U.S. PATENT DOCUMENTS

| | | | |
|---|---|---|---|
| 5,315,561 A | 5/1994 | Grossi | |
| 5,513,930 A | 5/1996 | Eathorne | |
| 5,579,285 A | 11/1996 | Hubert | |
| 5,598,152 A | 1/1997 | Scarzello et al. | |
| 5,633,649 A | 5/1997 | Grossi et al. | |
| 5,729,134 A | 3/1998 | Lavan, Jr. et al. | |
| 5,894,450 A | 4/1999 | Schmidt et al. | |
| 5,995,806 A | 11/1999 | Tsubouchi | |
| 6,034,603 A * | 3/2000 | Steeves | G06K 7/0008 235/384 |
| 6,058,071 A | 5/2000 | Woodall et al. | |
| 6,125,080 A | 9/2000 | Sonnenschein et al. | |
| 6,130,859 A | 10/2000 | Sonnenschein et al. | |
| 6,154,179 A | 11/2000 | Kohno | |
| 6,483,865 B1 | 11/2002 | Beierle | |
| 6,512,720 B1 | 1/2003 | Yang | |
| 6,522,284 B2 | 2/2003 | Miceli et al. | |
| 6,532,192 B1 | 3/2003 | Reid | |
| 6,534,985 B2 | 3/2003 | Holladay, III et al. | |
| 6,677,757 B2 | 1/2004 | Fine et al. | |
| 6,701,252 B2 | 3/2004 | Brown | |
| 6,873,250 B2 | 3/2005 | Viana et al. | |
| 6,933,884 B2 | 8/2005 | Martin et al. | |
| 6,941,226 B2 | 9/2005 | Estep | |
| 6,967,574 B1 | 11/2005 | Nelson | |
| 7,000,560 B2 | 2/2006 | Wingett et al. | |
| 7,078,906 B2 | 7/2006 | Nelson | |
| 7,139,647 B2 | 11/2006 | Larsen | |
| 7,148,691 B2 | 12/2006 | Nelson et al. | |
| 7,194,975 B2 | 3/2007 | Potter et al. | |
| 7,226,328 B1 | 6/2007 | Puzella et al. | |
| 7,233,795 B1 | 6/2007 | Ryden | |
| 7,277,010 B2 | 10/2007 | Joao | |
| 7,496,002 B2 | 2/2009 | Vosburgh | |
| 7,711,322 B2 | 5/2010 | Rhodes et al. | |
| 7,826,794 B2 | 11/2010 | Rhodes et al. | |
| 7,853,206 B2 | 12/2010 | Rhodes et al. | |
| 7,865,139 B2 | 1/2011 | Dinn et al. | |
| 7,873,316 B2 | 1/2011 | Rhodes et al. | |
| 7,877,059 B2 | 1/2011 | Rhodes et al. | |
| 7,982,679 B2 | 7/2011 | Rhodes et al. | |
| 8,045,919 B2 | 10/2011 | Rhodes et al. | |
| 8,055,193 B2 | 11/2011 | Rhodes et al. | |
| 8,326,219 B2 | 12/2012 | Rhodes et al. | |
| 8,335,469 B2 | 12/2012 | Rhodes et al. | |
| 8,346,164 B2 | 1/2013 | Rhodes et al. | |
| 8,358,973 B2 | 1/2013 | Rhodes et al. | |
| 8,364,078 B2 | 1/2013 | Rhodes et al. | |
| 8,437,224 B2 | 5/2013 | Rhodes et al. | |
| 8,515,344 B2 | 8/2013 | Rhodes et al. | |
| 8,531,918 B2 | 9/2013 | Rhodes et al. | |
| 8,577,288 B2 | 11/2013 | Rhodes et al. | |
| 9,037,079 B2 | 5/2015 | Wolfe et al. | |
| 9,037,181 B2 * | 5/2015 | Keshavarzian | H04W 52/0235 455/338 |
| 10,270,540 B2 | 4/2019 | Rhodes et al. | |
| 2002/0176323 A1 | 11/2002 | Magine et al. | |
| 2002/0180443 A1 * | 12/2002 | Fine | G01V 3/104 324/338 |
| 2003/0016130 A1 | 1/2003 | Joao | |
| 2004/0009759 A1 * | 1/2004 | Mayor | H04B 1/7156 455/258 |
| 2004/0266497 A1 | 12/2004 | Reagor et al. | |
| 2005/0122231 A1 * | 6/2005 | Varaiya | H04W 40/22 340/870.01 |
| 2006/0209715 A1 * | 9/2006 | Kushalnagar | H04L 12/12 370/254 |
| 2006/0286931 A1 * | 12/2006 | Rhodes | H04B 13/02 455/40 |
| 2007/0077951 A1 * | 4/2007 | Manjeshwar | G04G 7/02 455/515 |
| 2007/0229237 A1 * | 10/2007 | Kates | G08B 25/009 340/426.25 |
| 2008/0049700 A1 * | 2/2008 | Shah | G01D 21/00 370/342 |
| 2010/0027449 A1 | 2/2010 | Kim | |
| 2010/0134319 A1 | 6/2010 | Rhodes et al. | |
| 2010/0315981 A1 | 12/2010 | Keshavarzian | |
| 2011/0299364 A1 | 12/2011 | Rhodes et al. | |
| 2014/0065953 A1 | 3/2014 | Rhodes et al. | |
| 2015/0085853 A1 | 3/2015 | Smith et al. | |
| 2016/0264223 A1 | 9/2016 | Ferguson et al. | |
| 2017/0350615 A1 | 12/2017 | Ashar | |
| 2018/0337737 A1 | 11/2018 | Hyland | |
| 2019/0253156 A1 | 8/2019 | Rhodes et al. | |
| 2019/0334630 A1 | 10/2019 | Rhodes et al. | |

FOREIGN PATENT DOCUMENTS

| | | |
|---|---|---|
| GB | 2 457 581 A | 8/2009 |
| WO | WO 87/04028 A1 | 7/1987 |
| WO | WO 94/10629 A1 | 5/1994 |
| WO | WO 2014/128512 A1 | 8/2014 |
| WO | WO 2015/012970 A2 | 1/2015 |

OTHER PUBLICATIONS

PCT/GB2014/050568, dated Jun. 4, 2014, Written Opinion.
PCT/GB2014/050568, dated Sep. 3, 2015, International Preliminary Report on Patentability.
PCT/GB2016/000205, dated Apr. 24, 2017, International Search Report and Written Opinion.
PCT/GB2016/000205, dated May 31, 2018, International Preliminary Report on Patentability.
International Search Report and Written Opinion for International Application No. PCT/GB2016/000205, dated Apr. 24, 2017.
Written Opinion for International Application No. PCT/GB2014/050568 dated Jun. 4, 2014.
International Preliminary Report on Patentability for International Application No. PCT/GB2014/050568 dated Sep. 3, 2015.
International Preliminary Report on Patentability for International Application No. PCT/GB2016/000205 dated May 31, 2018.

* cited by examiner

UNDERWATER POWER SAVING MECHANISM FOR USE IN AN COMMUNICATION NETWORK

CROSS-REFERENCE TO RELATED APPLICATIONS

This application is a 371 application of International Application No. PCT/GB2014/050568, filed Feb. 25, 2014 which claims priority to GB Application No. 1303328.7, filed Feb. 25, 2013.

The present invention relates to a power saving mechanism for use in an underwater communication network and in particular, though not exclusively, to an underwater communication network based on having an improved wireless communication between nodes of the communication network.

The use of underwater communication has become more commonplace as an increasing use of the waterways and oceans is made for uses such as energy generation, resource management, transport and leisure.

The deployment of devices underwater has become an everyday occurrence in order to service the requirements of underwater communications that use of the oceans and waterways has created. However, supply of power can be problematic to underwater devices such as sensors, navigation beacons or network nodes and the provision of underwater power supply networks or the swapping out of batteries underwater is time consuming, difficult and costly. Thus, creating devices for use underwater which enable prolonged usage without the need for battery replacement is desirable. In turn, this means that the minimization of power consumption in underwater devices is of great use.

Underwater communication networks, and in particular wireless communication networks, are an effective way of facilitating underwater communications. An example of a known underwater communications network is shown in FIG. 1. FIG. 1 illustrates a network 2 which is a cluster tree topology wherein the network 2 has a number of network clusters, in this case cluster 12a, 12b and 12c. Each cluster is formed of a plurality of network nodes 14 is provided with a network access point 10a, 10b and 10c respectively which form a network "trunk" 11. One of the network access points, in this case network access point 10a operates as a network manager 9a. Each independent cluster can only be accessed by their particular network access point on the trunk, so cluster 12c can only be accessed via network access point 10c on trunk 11. If any given network access point fails, the nodes within the related cluster cannot be accessed. This means that for successful ongoing network operation, it is necessary for built in redundancy of a back up network access device to be provided for every network access point.

Typically, each cluster 12a, 12b and 12c operates independently and concurrently with network manager 9a communicating along trunk 11 to each network manager 10a, 10b and 10c. However, if the clusters 12a, 12b and 12c are located in close proximity to one another interference between neighbouring nodes in different clusters will occur, this can be a particular problem for networks deployed in or around a blow out preventer or around a well head in oil well environments.

In addition, in a cluster tree configuration such a network 2, the network manager 9a knows about the network access point devices 10a, 10b and 10c however the nodes 14 in each individual cluster 12a, 12b and 12c are hidden from the network manager 9a. This means that dynamic allocation of communication time required by different nodes 14 is necessary; once such scheduling requirements are known, the precise time scheduling of transactions on the network 2 is important and must be governed by the central network manager 9a which much have intimate knowledge of the entire network even without direct visibility of nodes 14. As a result, such a network topology has weaknesses in that single failure points exist; interference can occur between nodes in independent cluster groups and effective network management is required despite the network manager not having full visibility of all network components. These issues all provide a network system with inherent weaknesses.

However, like all underwater devices, the requirements of underwater communication networks can often depend on the application for which it will be used. However, there are certain aspects of underwater communication networks which are typically universal for all underwater communications. For example, underwater communications networks can be expensive to deploy and so must be sufficiently robust to minimise the maintenance requirements for the period of time the network will function. In addition, wireless underwater communication system components typically each have a battery power supply and therefore for prolonged use of the network without battery replacement, battery power must be minimised as effectively as possible.

Furthermore, whilst underwater communication networks are operating in supervisory control and data acquisition (SCADA) applications which are open loop control, where measurement data is taken and communicated to a central location for monitoring, latency of the system is not critical. However, when underwater communications networks are operating in applications which are closed loop control, where a measurement data signal can result in an alarm which triggers a system shut down, timing and latency are critical and an essential part of the communication system design criteria.

It is an object of the present invention to provide an underwater communication network based on having an improved wireless communication between nodes of the communication network which obviates or mitigates the issues of the prior art.

According to a first aspect of the invention there is provided an underwater communications network comprising a plurality of communication nodes operable to wirelessly communicate with at least one other node in the network, each node having a transceiver and an observation mechanism wherein the observation mechanism is operable to monitor signals received by the transceiver and upon reception of a first predetermined tone the observation mechanism outputs a signal operable to adjust the node from a passive operation mode to an active operation mode.

In this way, the underwater communications network is able to operate in a manner which requires no exact time synchronisation as each node can operate in a passive reception mode in which it is operable to move into an active operation mode when it receives a first predetermined tone which may be sent as a precursor to the reception or the required transmission of data signals. This means when no data reception is occurring, the node is in the passive reception mode which means it is always open to receiving first predetermined tone, which can be a pre-data reception alert signal, but at the same time is in a low power consumption mode of operation thus only moving into active operating mode when data communication is occurring. Such an arrangement means that data reception or transmission can occur whenever required and exact time synchronisation between the nodes is not required to facilitate effective and efficient data transfer.

The underwater communications network may further comprise a network control unit having a wireless transceiver, the control unit operable to communicate with each node in the network.

The provision of a network control unit enables the implementation of effective data transfer between nodes within the network.

The network control unit may comprise a token signal output unit operable to transmit a token signal to a node which is predetermined to transmit data to another node within the network.

By having a token signal output, the network control unit can ensure that a node is alerted at the appropriate time as to the requirement of the node to transfer data.

The token signal may be a second predetermined tone. The second predetermined tone may be a different predetermined tone from the first predetermined tone.

Each node observation mechanism is operable to monitor signals received by the transceiver and upon reception of a second predetermined tone, the observation mechanism outputs a signal operable to adjust the node from a passive mode to an active operation mode.

The first predetermined tone may indicate a move from passive mode to active reception mode; a second predetermined tone may indicate a move from passive mode to active transmission mode. By providing a first tone and second tone which are different from one another and which implement the shift from passive mode to different active modes, the data transmission and reception occurring between two nodes can be streamlined further with a minimisation of header data to indicate the communication purpose, this thus minimises the time in which the nodes remain in active operation mode thus further minimising the power consumption.

In this way, the underwater communications network is able to operate in a manner which requires no exact time synchronisation as each node can operate in a passive reception mode in which it is operable to move into an active operation mode, which may be an active transmission or an active reception mode, when it receives a second predetermined tone from the network access control unit as a precursor to the transmission of data communications. This means when no data transmission or reception is occurring, the node is in the passive reception mode which means it is always open to receiving first or second predetermined tone, but at the same time is in a low power consumption mode of operation. Such an arrangement means that data reception can occur whenever required and exact time synchronisation between the nodes is not required to facilitate effective and efficient data transfer.

Each node is further provided with a tone output mechanism operable to output a predetermined tone upon entering an active transmission mode.

The tone output mechanism enables the node to transmit a predetermined tone for receipt by other nodes in order to alert them to an impending data transfer occurring from which they can receive data.

Preferably, the data is transmitted as an electromagnetic and/or magneto-inductive signal.

Signals based on electrical and electromagnetic fields are rapidly attenuated in water due to its partially electrically conductive nature. Propagating radio or electromagnetic waves are a result of an interaction between the electric and magnetic fields. The high conductivity of seawater attenuates the electric field. Water has a magnetic permeability close to that of free space so that a purely magnetic field is relatively unaffected by this medium. However, for propagating electromagnetic waves the energy is continually cycling between magnetic and electric field and this results in attenuation of propagating waves due to conduction losses. The seawater provides attenuation losses in a workable bandwidth which provides for data transmission over practical distances.

The data may be compressed prior to transmission. Compression allows the occupied transmission bandwidth to be reduced. In this way, increased data rates can be transmitted over equivalent distances.

Optionally, the data is compressed in combination with use of a lower carrier frequency. The lower carrier frequency leads to lower attenuation. This in turn allows data transfer through fluids over greater transmission distances. In this way the data compression and carrier frequency can be adjusted as the parts are brought together so that increased data is transmitted at closer distances.

Preferably, the data transmission is bi-directional. In this way, command and control signals can be transferred between nodes. Advantageously, each node includes a local battery. Advantageously, each network access control unit includes a local battery. In this way, the network components do not require an umbilical connection to surface.

Preferably, each transceiver has an electrically insulated magnetic coupled antenna. Alternatively, each transceiver has an electric field coupled antenna. The antenna may be a wire loop, coil or similar arrangement.

Such antenna create both magnetic and electromagnetic fields. The magnetic or magneto-inductive field is generally considered to comprise two components of different magnitude that, along with other factors, attenuate with distance (r), at rates proportional to $1/r^2$ and $1/r^3$ respectively. Together they are often termed the near field components. The electromagnetic field has a still different magnitude and, along with other factors, attenuates with distance at a rate proportional to l/r. It is often termed the far field or propagating component. Such a transceiver is manufactured by the Applicant, WFS Technologies.

Preferably, the transceivers provide positioning and guidance data as is known in the art. Preferably, the nodes are operable to collect data from sensors or detectors. The sensors and detectors are preferably those required for positioning and guidance. In particular, but not exclusively, the sensors may comprise pressure sensors, gyroscopes, inclinometers or accelerometers.

According to another aspect of the invention there is provided an underwater device provided with a transceiver and an observation mechanism wherein the transceiver is operable to receive signals from a remote device, the observation mechanism is operable to monitor signals received by the transceiver and upon reception of a first predetermined tone, the observation mechanism outputs a signal operable to adjust the underwater device from a passive reception mode to an active mode.

Such an underwater device has the provision to conserve power by working on a minimally powered passive reception mode whereby only a specific predetermined tone will be observed to ensure that active mode, which is a power hungry mode of operation, only occurs when a predetermined tone has been received to indicate that data transmission or reception should occur. Thus, with no requirement for time synchronisation with any other device, the underwater device is in a mode operable to receive or transmit data only when required and thus minimize the power usage of the device at all other times.

According to a further aspect of the present invention there is provided an underwater communications system comprising a first underwater unit comprising a first transceiver and an observation mechanism and a second remote unit comprising a second transceiver wherein the second remote unit is operable to transmit a predetermined tone to the first underwater unit which is operable to be received by the first transceiver whereupon the observation mechanism is operable to monitor signals received by the first transceiver and upon reception of the first predetermined tone, the observation mechanism outputs a signal operable to adjust the first underwater unit from a passive reception mode to an active mode operable to communicate a data signal with the second remote unit.

BRIEF DESCRIPTION OF DRAWINGS

Embodiments of the present invention will now be described, by way of example only, with reference to the accompanying drawings of which:

In FIG. 2 there can be seen an underwater communication network 20 having a mesh topology. The network 20 has a network manager 21 which is able to control time scheduling of transactions.

Figure 1:
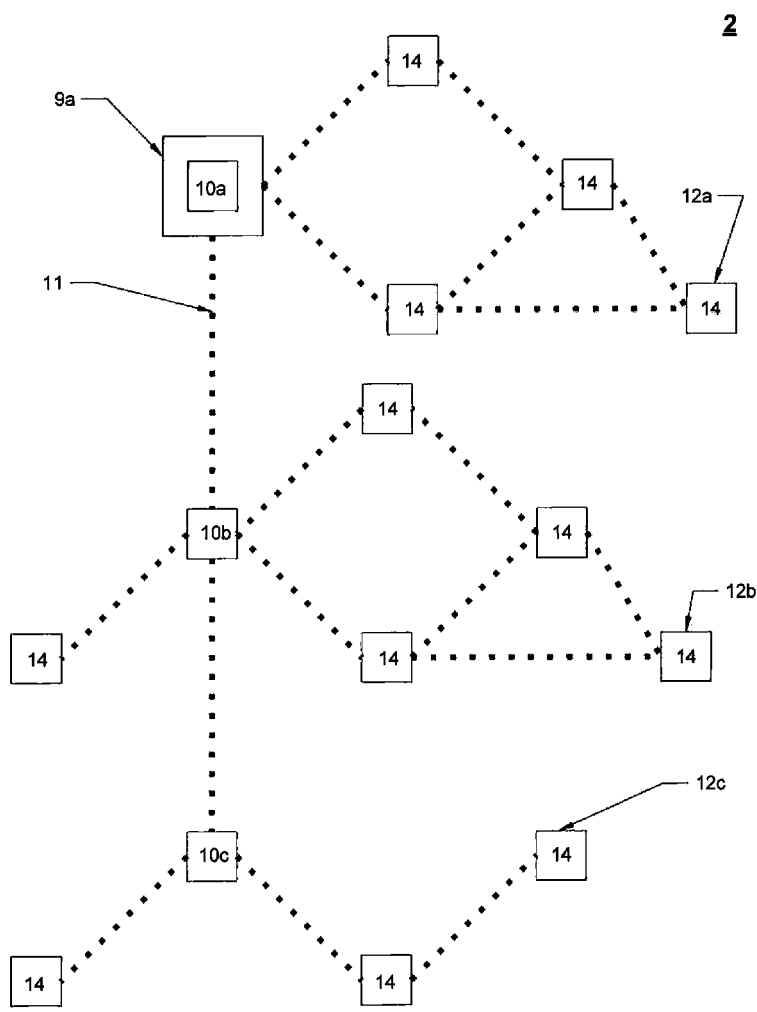
FIG. 1 is a block diagram of a known underwater communication network.

As can be seen, a variety of device types are found within mesh network 20. In this case, the network 20 is provided with six field devices, or nodes 24a-f which are each provided with a wireless transceiver 30, an observation mechanism 32, a token confirmation unit 33, a tone output mechanism 34 and a data processor 35. Each node 24 can be a basic device operable to perform functions such as, but not limited to, field sensing, actuating or control functions as well as transmission and receiving. It will be appreciated that nodes 24a-f may alternatively be simplified such that each node 24 can simply act as a routing or transmitting/received device to provide a communication link between two other field devices 24 which are not within transmission range of each other.

In this case, two Network Access Points (NAP) 22a, 22b are provided which give access to the mesh network 20. Each NAP 22 is provided with a a wireless transceiver 30 and can operate as the communication link to field devices 24a-f.

Multiple network access points 22 are incorporated within the network 20 in order to build in network redundancy, thus increasing reliability. However, it will be appreciated that only a single network access point is necessary. Each NAP 22 will store the network data received from the field devices 24a-f ready for harvesting. There is a network bandwidth requirement to move the harvested data between NAPs 22a, 22b.

The NAPs 22 may incorporate a modem operating at a significantly higher data rate than the network devices 24 and other components within the mesh network 20 in order to allow high speed data harvesting. In addition, it will be appreciated that any given NAP may be hardwired to a host application (not shown).

Router 26 which is provided with a transceiver 30 provides the mesh network 20 with a communication link between other mesh networks (not shown) or communication devices (not shown).

Adapter 28, which is provided with a transceiver 30, can give the mesh network 20 an access point that can enable wired devices to connect to the network 20.

A guest device (not shown), typically an ROV, can interface to the mesh network 20 via an NAP 22. The guest device may wish to harvest data from the mesh network 20 or configure the mesh network 20. Guest devices do not join the network 20, they are merely granted access to a NAP 22 which is already a permanent member of the network 20. If the NAP 22 is willing, it can communicate with the network 20 on behalf of the guest device.

A guest device (not shown), such as an ROV or AUV communicates with an NAP using the lowest level protocol. A security layer of processing should be added above the low level protocol because this communication with the NAP22 is the only point where access to the network 20 can be gained by a guest device. Implementers (not shown) can provide the necessary additional processing power to each NAP22 to support this processing requirement for such a security layer thus keeping normal network nodes 24 as power efficient as possible.

Gateway 29 which is, in this case, provided with a further NAP 22c which has a transceiver 30, serves as the interface between network 20 and other networks (not shown) which are running different protocols. It will be appreciated that the Gateway 29 may or may not be required within the shown network depending on the field of operation.

Network manager 21 is, in this case, incorporated with NAP device 22a and controls mesh network 20. Network manager 21 determines the communication time required by each device 24a-f in combination with applications running on the devices 24a-f and the user demands which are placed upon device operation. The network manager 21 can cache data received from the mesh network 20 so that when a gues device (not shown) arrives to request network data, the network manager 21 can provide it immediately without having to interrogate the mesh nodes 24a-f. The network manager 21 can share the cached data with other NAPs, in this case with NAP 22b, so that a guest device can arrive at HAP 22b and immediately harvest network data.

For reliability, the network 20 must have built in redundancy in case the network manager 21 fails. Another NAP device, one of NAP 22b or 22c can act as the back-up network manager. The primary network manager 21 much periodically communication the network configuration and scheduling data along with any cached data to the back-up network manager, say in this case NAP 22b. The back-up network manager 22b must monitor these transactions from the network manager 21 and if these communications are absent, the back-up network manager 22b must assume control of the network 20.

In addition, a security manager 23 is embedded in network manager 21. Security manager 23 manages the software keys used at network and data link layers as well as joining keys.

In this case, the mesh network 20 is a static mesh network. In the subsea environment, the vast majority of deployments are of a known static mesh where there is no need for additional nodes to "join" the network. Any device arriving to harvest data or configure the network 20 will be a guest device which will access the static mesh using a NAP. Static mesh network routing tables used in such a system may have a redundancy built in. The network 20 will monitor the health of its static routes and will update the routing tables to facilitate "healing".

It will be appreciated that use of a network 20 having a mesh topology removes single points of failure within a network but without using redundant devices as back-up. As the entire mesh is a non-tiered network, single network manager 223 is able to control time-scheduling of transactions. This time-scheduling removes any interference between neighbouring nodes. In addition, in a mesh network such as network 20, additional devices may improve path diversity.

In use, the communications protocol used in network 20 is a layered protocol. The lowest layer is common to communications between the network nodes 24a-c and also between the NAP22a and optionally a guest device (not shown). This lowest layer protocol is responsible for the communications between two nodes, say nodes 24a and 24b that are within range of each other and so can communicate directly. The lowest layer protocol can support addressed communications and broadcast communications as well as simple unacknowledged communications which is useful when carrying streamed data that can afford to suffer some loss of data such as video streams, communications that employ error detection, and acknowledgements and retries for data integrity. In order to reduce interference caused by multiple nodes transmitting simultaneously, the lowest layer protocol employs carrier sense multiple access with collision avoidance (CSMA/CA) in that it listens for silence before transmitting.

The network manager 21, which manages the mesh network 20, arbitrates access to the physical wireless communications layer NAP 22a, 22b and nodes 24a-f and can also optionally provide guaranteed latency for time critical control applications which the network 20 may be used to implement.

Arbitration is managed via token passing architecture. The network manager 21 schedules events by using the token signal output 23 to pass tokens to network device 24. This architecture does not require precise time-synchronisation of all nodes 24a-f. As long as each node, for example node 24a, can use its observation mechanism 32 to "listen" whilst in a passive reception mode to neighbouring nodes, for example nodes 24b and 24c, each node need only respond when they are requested to do so and thus switch to an active reception and/or transmission mode. The network manager 21 need precise timing so that it can schedule token passing thus provide guaranteed latency.

When a node 24 receives a token using token confirmation unit 33, t his allows the node 24 to transmit data. However, the node 24 must prioritise which data it will send depending on whether it has network management data, alarm, or process data queued for transmission. This type of architecture is simpler to implement that a time division multiple access architecture as precise time synchronisation of all nodes in a mesh network, such as mesh network 20, is complex with this challenge being even more of a difficult in low bandwidth networks. Furthermore, in a time division multiple access system, once all nodes are time synchronised, they must be re-synchronised periodically to compensate for crystal oscillator drift which is typically 20 ppm and as a result, further error and unreliability exists which the currently described architecture detailed above avoids.

The currently described architecture is beneficial to network power management as while all nodes 24 in the mesh network 20 must "listen" for a predetermined tone or token not knowing when such a token will be transmitted, the nodes 24 have an extremely low current "listening" state in which only the observation mechanism 32 is operating. This is achieved using lower power circuitry which wakes up on reception and observation of a pilot tone. This approach requires that each transmitting node 24 sends a pilot tone followed by transmission of data. The implementation of this architecture requires no management time for time synchronisation of the network, or adaptive time slot allocation thus minimising the time during which the components are active and using higher power levels.

The network manager 21 can compensate for employment of different data transmission rates by scheduling token transactions at appropriate intervals, these being an integer number of the network time division. The time division can be, for example, 100 ms.

In use, data transmission between any two nodes 24a-f is a two stage transaction: a pilot tone is sent from node 24 using the tone output mechanism 34 followed by the transmission of data to a desired device address. For example, the pilot tone will be received by the transceivers 20 in each of the nodes 24d-f within range of the transmitting node, say node 24c in this case. The observation mechanism 34 in each of nodes 24d-f will, upon recognition of the tone, determine that the nodes 24d-24f have to waken up and the transceiver of these nodes has to move from a passive phase to an active mode of operation. There will be a wake-up delay before the receiving nodes 24d-f are able to receive transmitted data from node 24c. If the network manager period is 100 ms, the pilot tone wake up delay should ideally be a minimum of 50 ms. However, the pilot tone wake up period is configurable for the network and the network manager 21 will use this information when scheduling network events and configuring network nodes.

Following the pilot tone transmission, the data will be transmitted to a particular node address, say in this case node 24f. When the data is received at the correct address this receiving node 24f will send an acknowledgement to the transmitting modem, node 24c if, for example, an acknowledgement (ack) has been requested. The receiving node 24f does not need to send a pilot tone because the transmitting node 24c will have stayed awake waiting for the ack it has requested. The receiving node 24f may be the final destination address or simply a hop en route to the final destination address. The receiving node 24f will process or forward the data as necessary and once it has completed all tasks it will go back to sleep. All other nodes 24c and 24e which have woken on receipt of the pilot tone issued by node 24c will go back to sleep when the data transmission is to another address. If node 24f is indeed a hop, it will then send a pilot tone which will wake up nodes 24a, 24c and 24e and the onward transmission process will be repeated iteratively in this manner until the final destination for the data is reached.

Figure 2:
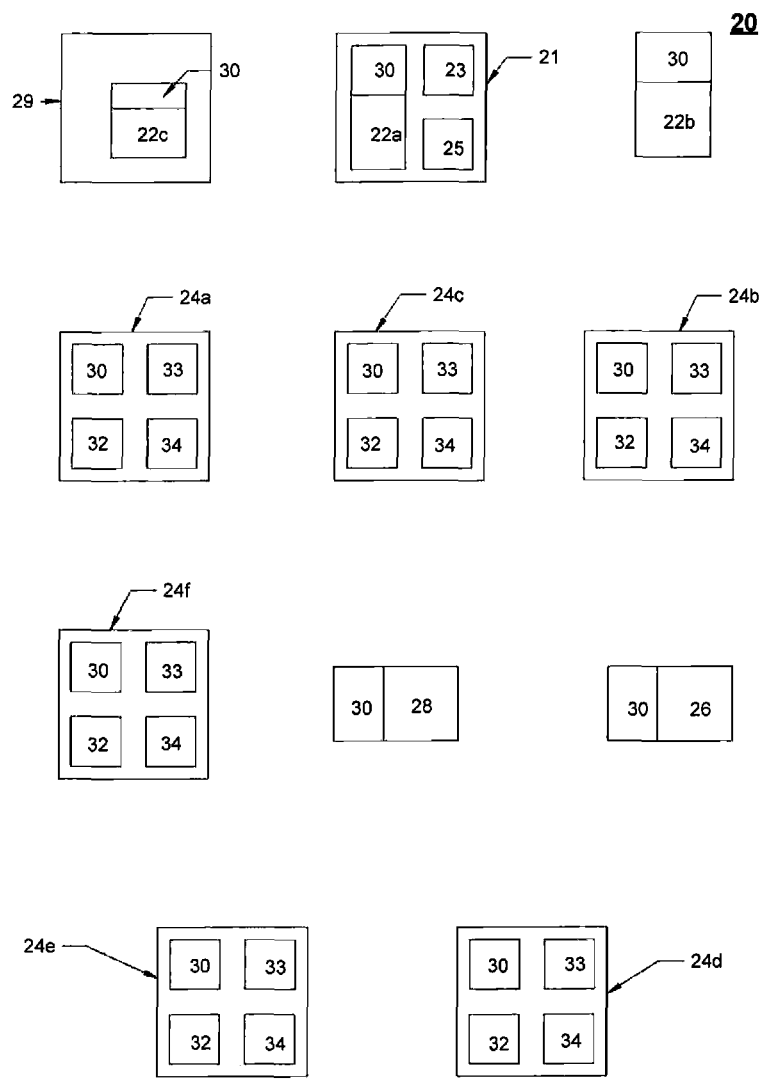
FIG. 2 is a block diagram of an underwater communication network of an embodiment of the present invention.
Figure 3:
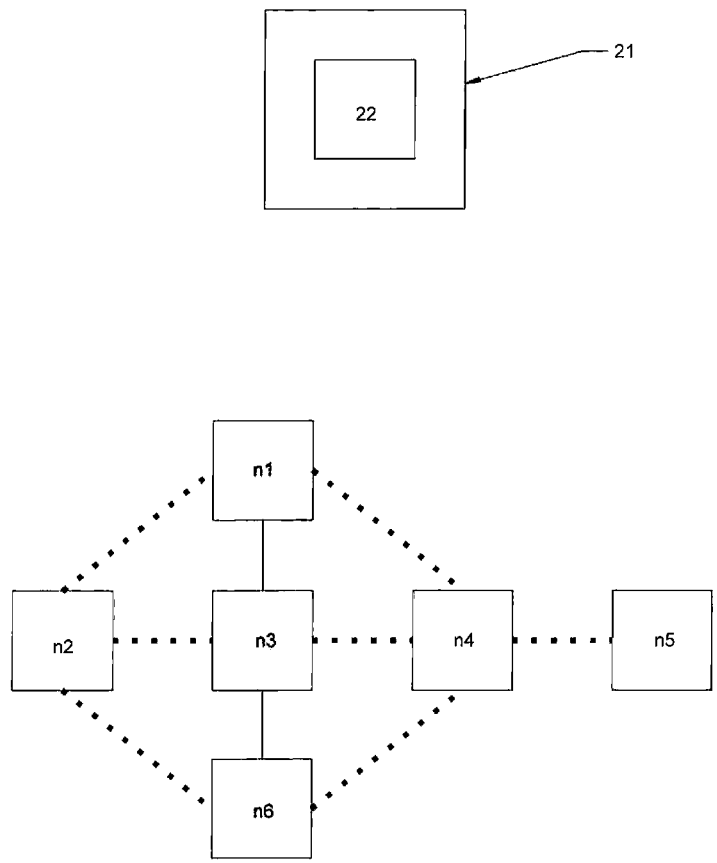
FIG. 3 is a block diagram of a data logging application according to an embodiment of the present invention.
Figure 4:
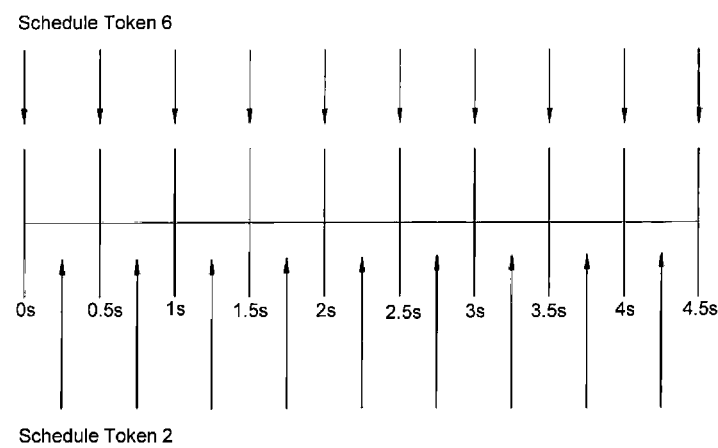
FIG. 4 is a schematic diagram of a scheduling pattern according to an embodiment of the present invention.

In FIG. 3 there is shown a block diagram of a system of scheduling tokens operable to be used by the network manager 21 of the network 20 of FIG. 2. The network manager is responsible for scheduling data transfer from node n2 to node n5 every 2 second and from n6 to node 4 every 0.5 s. In FIG. 4, a schematic diagram of the scheduling of such tokens is shown detailed with reference to FIG. 3 is shown. There are a number of different routes possible for each transaction. The nodes will use their own routing tables to prioritise routing. The network manager will schedule the transmission of a token to node n2 to allow it to transfer data to node n5. When node 2 receives this token it will check for queued data and will transfer it as required. Ideally the data will be transmitted from node n2 to node n3 and acknowledged; from node n3 to node n4 and acknowledged and finally from node n4 to node n5 and acknowledge. Retries are possible and failure on this route will initiate transmission via another rout.

All of this transmission routing happens automatically and the only constraining factor which may be required and must be issued by the network manager is the maximum time to keep trying. After this time is exhausted, the transaction will retire so that there is no interference with the next scheduled token. This is managed using a TTL (time to live) variable with the token.

TTL measures the number of hops to attempt before retiring. If the TTL variable is set to 0xFF this means keep going until all possible routes have been exhausted. If TTL is set to any other value then the TTL is decremented on each link tried. When TTL is decremented to zero, no further transmissions are attempted. The network manager can issue a token with TTL set to 0xFF if there is no subsequent time critical token scheduling required. Otherwise the network manger can set TTL to ensure this token transaction has retired before the next time critical token must be sent. This requires TTL in number of hops to be related to real time. This is done by the network manager using the employed network data rate and the maximum data payload and number of retries per hop.

It will be appreciated that, during operation, the network manager 21 may wish to broadcast information to all nodes 24a-f regarding the configuration of the network 20. For example, a pilot wake up delay may need to be broadcast. When a message is a broadcast message it is typically never acknowledged because of the interference that could occur when multiple nodes 24a-f acknowledge the broadcast simultaneously.

A similar problem occurs with cascaded broadcasting in the mesh network 20, such as when several nodes try to cascade broadcast simultaneously to another node. This can be managed by including a CSMA/CA system that incorporates a transmission delay based on the source address specifically for cascading broadcasts. The cascade broadcast message has a unique identification code (ID). Any node that receives a cascade broadcast message with an identical ID to one that it has already received will ignore it meaning that the broadcast message will cascade across the network without looping.

In an embodiment of the invention, the network manager may or may not need to adhere to real-time clock synchronisation depending on the host application and the provision of the pilot tone mechanism can obviate the need for such real-time clock synchronisation.

For applications requiring time stamping of data then all nodes may still require time synchronised real time clocks and the granularity of such clocks may be 500 ms.

When needed within network 20, security is handled via simple efficient security protocols based on private keys such as, but not limited to, encryption and digital signatures. For example, a self contained static mesh network will not allow nodes to join dynamically. Private keys are thus never shared or transmitted and instead are configured into nodes statically prior to deployment so security remains tight.

Figure 5:
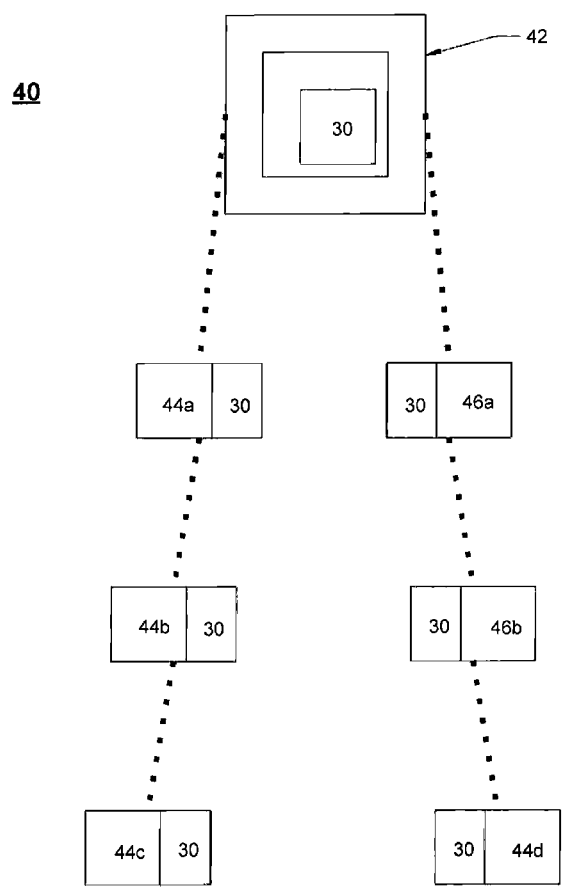
FIG. 5 is a block diagram of an underwater communication network according to an embodiment of the present invention.

A data logging application operating on a mesh network 40 such as that shown in FIG. 5 can be used as the basis for power budget analysis. In this case, the data logging environment may be around a BOP deployed subsea (not shown) to record environmental data relating to the installation. The mesh network 40 has a network manager 42, plural field devices 44a-d and routers 46a,b each of which is provided with a transceiver 30. Every field device 44a-d measures data for 0.5 s in every 100 s. It is assumed in the following discussion of the data logging application operation on mesh network 40 that there are no retries and every transmission is successful on its first attempt; sleep power mode is denoted $P_{SLEEP}$, time in sleep power mode is denoted $t_{PSLEEP}$; normal operation power mode is denoted $P_{ON}$, time in normal operation power mode is denoted $t_{PON}$; transmission power mode is denoted $P_{TX}$, time in transmission power mode is denoted $t_{PTX}$; n is the number of field devices; $n_D$ is the number of downstream field devices; $t_M$ is measurement time; $t_{TX}$ is measurement data transmission time, and 'downstream' devices are devices which use the device in question to route to the network controller.

Field sensors 44c and 44d are, in this case, only measuring and transmitting measured data. Therefore for these field sensors 44c and 44d $t_{PON}$=0.5%, $t_{PTX}$=0.5% and $t_{PSLEEP}$=99%. Field sensor 44b is measuring and transmitting measured data and is also a router for field sensor 44f so field sensor 44b must receive data from field sensor 44c and transmit it to field sensor 44a. Therefore for field sensor 44b $t_{PON}$=1% (0.5% to measure data+0.5% to receive data from field sensor 44c), $t_{PTX}$=1% and $t_{PSLEEP}$=98%.

Field sensor 44a is measuring and transmitting measured data and is also a router for field sensors 44c and 44b. Therefore, for field sensor 44a, $t_{PON}$=1.5%, $t_{PTX}$=1.5% and $t_{PSLEEP}$=97%. Router 46a and Router 46b are identical in that they are transmitting measured data from field sensor 44d to network manage 42. Therefore for each of router 46a and 46b, $t_{PON}$=0.5%, $t_{PTX}$=0.5% and $t_{PSLEEP}$=99%.

As network controller 42 can receive measured data from field sensors 44a, 44b, 44c and 44d then, for network controller 42, $t_{PON}$=2% and $t_{PSLEEP}$=98%.

From the above analysis it can be established that the network controller 42 must be active $t_{PON}$=n*$t_{TR}$. Therefore using the data-logging example above, for a mesh network with a maximum of 50 nodes, if all 50 nodes are field devices (including the network controller itself) then $t_{PON}$=25.5% and $t_{PSLEEP}$=74.5%.

It will be appreciated that field devices 44 must be active to measure data and transmit their measured data. They must also be active to receive and transmit measured data from all field devices downstream of themselves. The field device must be active $t_{PON}$–$t_M$+$n_D$*$t_{TX}P_{ON}$ and $t_{PTX}$–$(n_D+1)$*$t_{TX}$.

Router devices must be active to receive and transmit measured data from all field devices downstream of themselves. The field device must be active $t_{PON}$=$n_D$*$t_{TX}$ and $t_{PTX}$=$n_D$*$t_{TX}P_{ON}$.

The network controller active time is directly related to the number of field devices in the mesh and in this example, it does not change with range. Field devices are placed where required for sensing and data measurement. They can additionally perform routing but that is not their main function and so we can say that they are independent of range. Router devices are placed to link field devices which are out of range of each other. In FIG. 5, the nodes 46a and 46b are provided as routers. However, if the transmission range of transceiver 30 of node 46a is of sufficient distance such that router 46*b* is not required, this does not change the duration of $P_{ON}$ or $P_{TX}$ for node 46*a* as the duration of as the duration of $P_{ON}$ or $P_{TX}$ for node 46*a* is dependent on the number of field devices downstream of the router. Changes in transmission range of transceiver 30 also does not change the power budget of any of the network field devices, instead, the power budget is directly related to number of field sensor devices within network 40. However, changes in the transmission range of transceivers 30 will change the number of routers required to cover the same physical distance within the network 40. The number of additional routers required to cover the same physical distance can be calculated using the formula $$n_{extrarouters} = (\text{range}_{large})/(\text{range}_{small}) - 1$$

Therefore, if range$_{large}$=15 m and range$_{small}$=15 m then 2 additional routers are required if distance>15 m.

It will be appreciated that in an embodiment, the mesh network will operate between 100 Hz and 100 MHz, 25 bps to 10 Mbps spilt across three Bands A, B and C.

For example, a specific network manager can select to operate at a transmission frequency of 20 kHz and a data rate of 4800 bps. However, another network manager may select to operate at 12.7 kbps. Frequency hopping on a packet-by-packet basis need not be employed by network managers but can be employed to avoid interference from industrial plant or machinery which is operating in the vicinity. However, the occurrence of machinery interference is typically less problematic in subsea environments.

Figure 6:
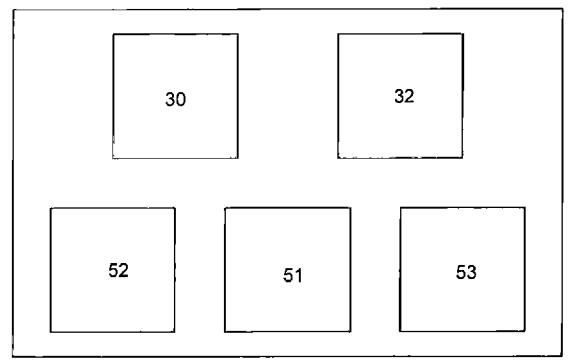
FIG. 6 is a block diagram of an underwater communications device according to an embodiment of the present invention.

In FIG. 6 there is illustrated an underwater unit, in this case an underwater installation such as a data logger 50 but which it will can be appreciated may also be any one of the units of networks 20 or 40 above or another discreet underwater unit for other purposes such as navigation beacon or an alarm. The data logger 50 is provided with a wireless transceiver 30, an observation mechanism 32, a processor unit 51 and a sensor 52 which may have a memory unit 53 for logging sensed data.

The observation mechanism 32 will include a wake up circuit (not shown) which will run at minimal power consumption. To achieve such minimal power consumption the wake up circuit can be a simple analogue circuit that includes a low power operational amplifier (op-amp) which provides some gain on the tone signal which is received from a remote transceiver (not shown) and a comparator that will output a signal when the amplitude of the tone detected crosses a threshold. The level of the threshold will be set at a suitable level which balances the risk of too low a threshold which trips on noise thus falsely switching to active mode too often, or having too high a threshold that requires a very strong tone to wake up the system.

The power supply for the observation mechanism 32 will be always ON even when the transceiver is in the passive mode of operation. The output of the observation mechanism wake up circuit will activate the provision of power to the main transceiver system such that it then operates in active mode.

The data logger 50 may operate on a timed basis such that data recordal is scheduled to occur at a predetermined time interval and the sensor 52 is in shut down mode until it is time for a measurement to be made. When the sensor 52 is then activated, appropriate data is sensed and recorded in the memory unit 53. Upon the sensed data being recorded, the sensor 52 once again reverts to sleep mode thus minimizing power consumption in underwater unit 50. Suring this operation the transceiver 30 can remain in a passive mode.

Figure 7:
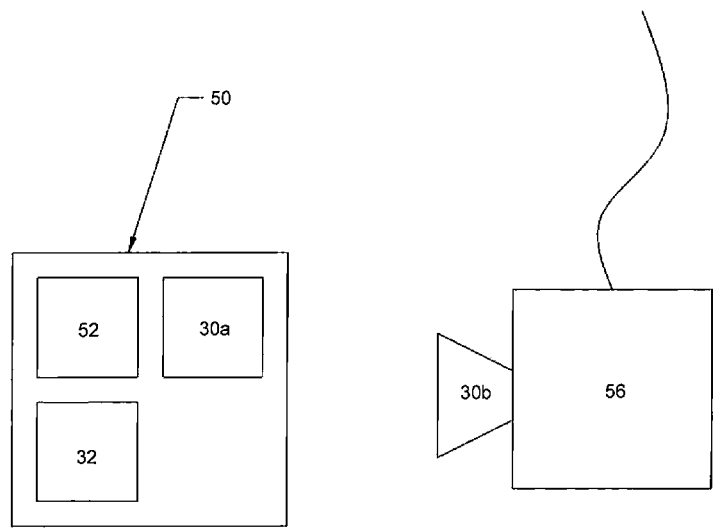
FIG. 7 is a block diagram of an underwater communications device according to an embodiment of the present invention.

As can be seen in FIG. 7, when the recorded data is required to be retrieved from unit 50, an interrogation unit, in this case AUV 56 can approach the unit 50 and the transceiver 30*b* of AUV can output a tone to transceiver 30*a* of unit 50. Upon reception of the tone at transceiver 30*a*, the observation mechanism 32 will identify that the transceiver 30*a* must switch from operating in a passive, lower power consumption mode where it is only sensitive to reception of the predetermined tone to an active mode of transmission. The transceiver 30*a* can then send an acknowledgement signal to transceiver 30*b* indicative that 30*a* is active. Transceiver 30*b* can then interrogate data logger 50 for the transmission of recorded data logged in memory 53. Upon transmission of the recorded data from transceiver 30*a* to transceiver 30*b*, the transceiver 30*a* can again return to a passive mode listening only for the predetermined tone and thus return to a state of minimum power consumption.

It will be appreciated that a second tone, which is different from that used to switch the unit to an active mode of transmission, could be used, to switch the unit to an active mode of reception thus removing the need for an acknowledgement signal and interrogation signal being transferred. Alternatively a single predetermined tone may be operable to achieve active mode for transmission and reception in which case acknowledgement and interrogation or data signals will be required thus lengthening the transmission/reception process.

During the data transfer process, the data is transmitted as an electromagnetic and/or magneto-inductive signal. Signals based on electrical and electromagnetic fields are rapidly attenuated in water due to its partially electrically conductive nature. Propagating radio or electromagnetic waves are a result of an interaction between the electric and magnetic fields. The high conductivity of seawater attenuates the electric field. Water has a magnetic permeability close to that of free space so that a purely magnetic field is relatively unaffected by this medium. However, for propagating electromagnetic waves the energy is continually cycling between magnetic and electric field and this results in attenuation of propagating waves due to conduction losses. Different fluid compositions result in differing levels of attenuation and thus result in different operational bandwidths depending on the fluid in which transmission is taking place. The data may be compressed prior to transmission. Compression allows the occupied transmission bandwidth to be reduced. In this way, increased data rates can be transmitted over equivalent distances. Optionally, the data can be compressed in combination with use of a lower carrier frequency. Use of a lower carrier frequency can lead to lower attenuation. This in turn allows data transfer through fluids over greater transmission distances. In this way the data compression and carrier frequency can be adjusted as the parts are brought together so that increased data is transmitted at closer distances.

Figure 8:
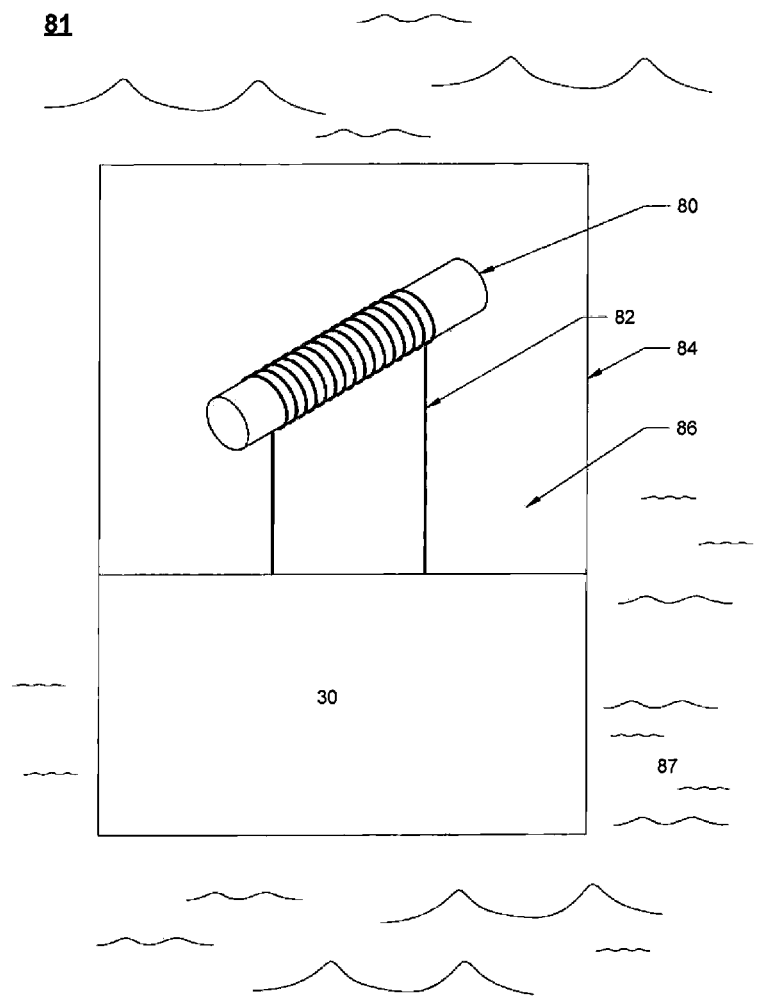
FIG. 8 is a schematic diagram of an antenna for use in a transmitter or receiver of a transceiver used in any of the systems of any of FIGS. 2 to 7.

FIG. 8 illustrates an example of an antenna 81 that can be used in the transmitter and receiver the transceivers of nodes, NAPs and Network Managers, routers, field devices or the like such as those illustrated in FIG. 2, 3, 5, 6 or 7. This antenna 81 has a high permeability ferrite core 80. Wound round the core 80 are multiple loops 82 of an insulated wire. The number of turns of the wire and length to diameter ratio of the core 80 can be selected depending on the application.

However, for operation at 125 kHz, one thousand turns and a 10:1 length to diameter ratio can be suitable. The antenna is connected to the relevant, in this case those of transceivers 30 detailed in the above figures, and included in a sealed housing 84. Within the housing the antenna may be surrounded by air or some other suitable insulator 86, for example, low conductivity medium such as distilled water that is impedance matched to the propagating medium 87. Eddy current losses increase with frequency so also act to reduce the bandwidth available for data transmission. However depending on the transfer efficiency required for data communication applications the balance of a choice between a higher frequency and a more efficient data transmission process will be reached for the data communication signals. While a transceiver 30 is described with a common antenna for transmit and receive it will be appreciated that separate antennas may be used and each antenna may be in the form of that shown in FIG. 8.

The principle advantage of the present invention is that it provides an underwater communication network able to operate with good latency without the requirement for a time synchronization system being implemented.

A further principle advantage of the present invention is that it provides a mechanism for minimization of power consumption for units or systems deployed in an underwater environment. This enables underwater installations to remain operable for longer upon deployment and thus minimize ongoing operational costs.

A further advantage of at least one embodiment of the present invention is power consumption of the underwater communication network can be minimized. This allows for network installation to remain operable for longer once deployed and thus in a more cost effective manner and with less risk of damage occurring to components.

A yet further advantage of at least one embodiment of the present invention is that it provides a underwater communication system which does not require umbilical connection to be made with an external component as a network connection can be maintained wirelessly.

It will be appreciated by those skilled in the art that various modifications may be made to the invention herein described without departing from the scope thereof. For example, each node 24 is detailed with reference to FIG. 2 as having a observation mechanism 32, a token confirmation unit 33, a tone output mechanism 34 and a data processor 35 however it will be appreciated each of these mechanisms could be incorporated within a data processor unit. Also, although detailed as a static network, mesh network 20 may be an adaptive mesh network where additional nodes (not shown) can join the network as and when required. The adaptive mesh network may be self-organising and self-healing, using health reports and diagnostic information to implement these functions. The adaptive mesh network will have redundancy built in to the network routing tables (not shown) such that multiple routes between nodes 24 will be known. Such graph routing architecture allows selected routes to adapt to network conditions. Statistics on each route will be gathered to allow best-case prioritisation of the routes in the routing table. It will also be appreciated that a route with a larger number of hops could be more robust than a route with fewer hops. The detailed architecture can support a simple point-to-point network and this can be achieved by having two NAPs where neither is configured as the network manager. This being the case, each NAP knows that it can initiate conversation with the other. Although unit 50 is described as a data logger, it may be any underwater unit or installation of the many various known types. In addition, although the remote unit 56 is described as an AUV, it may be any suitable remote unit including an ROV, a diver, a submarine or the like. Furthermore, although the system and units herein are described as being deployed in an underwater environment, it will be understood that underwater may be freshwater, saltwater or any other fluid including but not limited to oil, petrochemical fluids, fracking fluids or the like.

The invention claimed is:

1. An underwater communications network comprising:
a plurality of communication nodes operable to wirelessly communicate with at least one other node in the underwater communications network, each communication node of the plurality of communication nodes having a transceiver and an observation mechanism, wherein:
the observation mechanism is configured to:
monitor signals received by the transceiver,
upon reception of a first predetermined tone at the transceiver while the transceiver operates in a passive operation mode:
determine that the communication node is to be woken up, and
output a signal operable to switch the transceiver from the passive operation mode to an active reception mode and activate provision of power to the transceiver to enable the transceiver to operate in the active reception mode, and
upon reception of a second predetermined tone at the transceiver while the transceiver operates in the passive operation mode:
determine that the communication node is to be woken up, and
output a signal operable to switch the transceiver from the passive operation mode to an active transmission mode and activate provision of power to the transceiver to enable the transceiver to operate in the active transmission mode.

2. The underwater communications network of claim 1, further comprising a network control unit having a wireless transceiver, the network control unit operable to communicate with each communication node in the underwater communications network.

3. The underwater communications network of claim 2, wherein the network control unit further comprises a token signal output unit operable to transmit a token signal to another node within the underwater communications network.

4. The underwater communications network of claim 3, wherein the token signal is the second predetermined tone.

5. The underwater communications network of claim 4, wherein the second predetermined tone is a different predetermined tone from the first predetermined tone.

6. The underwater communications network of claim 1, wherein the first predetermined tone indicates adjustment from the passive operation mode to the active reception mode.

7. The underwater communications network of claim 1, wherein the second predetermined tone indicates adjustment from the passive operation mode to the active transmission mode.

8. The underwater communications network of claim 1, wherein each communication node further comprises a tone output mechanism operable to output a predetermined tone upon entering the active transmission mode.

9. The underwater communications network of claim 1, wherein data transmission is operable to occur whilst in the active transmission mode.

10. The underwater communications network of claim 9, wherein the data is transmitted as an electromagnetic and/or magneto-inductive signal.

11. The underwater communications network of claim 9, wherein the data transmission is bi-directional.

12. The underwater communications network of claim 1, wherein each communication node includes a local battery.

13. The underwater communications network of claim 1, wherein the observation mechanism is configured to determine that the communication node is to be woken up when an amplitude of the first predetermined tone exceeds a threshold value or an amplitude of the second predetermined tone exceeds a threshold value.

14. The underwater communications network of claim 1, wherein each communication node further includes a memory configured to record data sensed by at least one sensor, wherein the transceiver remains in the passive operation mode during recording of the data.

15. An underwater device comprising:
a transceiver configured to:
receive signals from a remote device via an underwater communications network,
receive a first predetermined tone while operating in a passive operation mode, the first predetermined tone indicating a move from the passive operation mode to an active reception mode, and
receive a second predetermined tone while operating in the passive operation mode, the second predetermined tone indicating a move from the passive operation mode to an active transmission mode; and
an observation mechanism configured to:
monitor the signals received by the transceiver, and
upon reception of the first predetermined tone at the transceiver:
determine that the underwater device is to be woken up, and
output a signal operable to switch the transceiver from the passive operation mode to the active reception mode and activate provision of power to the transceiver to enable the transceiver to operate in the active reception mode, and
upon reception of the second predetermined tone at the transceiver:
determine that the underwater device is to be woken up, and
output a signal operable to switch the transceiver from the passive operation mode to the active transmission mode and activate provision of power to the transceiver to enable the transceiver to operate in the active transmission mode.

16. The underwater device of claim 15, wherein data communication occurs in the active reception mode and the active transmission mode.

17. The underwater device of claim 16, wherein the data communication occurs using a low carrier frequency.

18. An underwater communications system comprising:
a first underwater unit comprising a first transceiver and an observation mechanism; and
a second remote unit comprising a second transceiver;
wherein the second remote unit is operable to transmit one or more predetermined tones to the first underwater unit which is operable to be received by the first transceiver of the first underwater unit whereupon the observation mechanism is configured to:
monitor signals received by the first transceiver,
upon reception of a first predetermined tone at the first transceiver while the first transceiver operates in a passive operation mode:
determine that the first underwater unit is to be woken up, and
output a signal operable to switch the first transceiver from the passive operation mode to an active reception mode and activate provision of power to the first transceiver to enable the first transceiver to operate in the active reception mode, and
upon reception of a second predetermined tone at the first transceiver while the first transceiver operates in the passive operation mode:
determine that the first underwater unit is to be woken up, and
output a signal operable to switch the first transceiver from the passive operation mode to an active transmission mode and activate provision of power to the first transceiver to enable the first transceiver to operate in the active transmission mode.

19. The underwater communications network of claim 1, wherein the transceiver comprises an antenna included in a sealed housing, and wherein the antenna is surrounded by an insulator within the sealed housing.

\* \* \* \* \*